United States Patent
Sekiya

(10) Patent No.: US 10,811,745 B2
(45) Date of Patent: Oct. 20, 2020

(54) VEHICLE BATTERY PACK

(71) Applicant: SUBARU CORPORATION, Tokyo (JP)

(72) Inventor: Yasuhiro Sekiya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 227 days.

(21) Appl. No.: 15/992,716

(22) Filed: May 30, 2018

(65) Prior Publication Data

US 2019/0020080 A1    Jan. 17, 2019

(30) Foreign Application Priority Data

Jul. 12, 2017   (JP) .................. 2017-136380

(51) Int. Cl.
| | |
|---|---|
| *H01M 2/10* | (2006.01) |
| *H01M 10/6561* | (2014.01) |
| *H01M 10/613* | (2014.01) |
| *H01M 10/625* | (2014.01) |
| *B60K 1/04* | (2019.01) |
| *H01M 10/615* | (2014.01) |
| *H01M 2/12* | (2006.01) |
| *B60K 1/00* | (2006.01) |
| *H01M 10/6556* | (2014.01) |

(Continued)

(52) U.S. Cl.
CPC .......... *H01M 10/6561* (2015.04); *B60K 1/04* (2013.01); *H01M 2/1077* (2013.01); *H01M 2/12* (2013.01); *H01M 10/613* (2015.04); *H01M 10/615* (2015.04); *H01M 10/625* (2015.04); *B60K 2001/005* (2013.01); *B60K 2001/0416* (2013.01); *B60K 2001/0433* (2013.01); *H01M 10/655* (2015.04); *H01M 10/6556* (2015.04); *H01M 10/6557* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 2013/0071705 A1* | 3/2013 | Frutschy | H01M 2/1016 429/62 |
| 2015/0228947 A1* | 8/2015 | Nagamine | H01M 2/12 429/87 |

(Continued)

FOREIGN PATENT DOCUMENTS

| | | |
|---|---|---|
| JP | 2006-147531 | 6/2006 |
| JP | 2016-134245 A | 7/2016 |

OTHER PUBLICATIONS

Japanese Office Action dated Mar. 26, 2019 for JP 2017-136380 (4 pages in Japanese with English translation).

*Primary Examiner* — Jeremiah R Smith
(74) *Attorney, Agent, or Firm* — Smith, Gambrell & Russell, LLP

(57) ABSTRACT

A vehicle battery pack includes a plurality of battery stacks, a battery case, a partition, and an air passage. The plurality of battery stacks each include a plurality of battery cells. The battery case houses the plurality of battery stacks. The partition divides an internal space of the battery case into an upper space and a lower space and is made of a plurality of materials. At least part of the air passage is defined by the partition.

19 Claims, 8 Drawing Sheets

(51) Int. Cl.
*H01M 10/655* (2014.01)
*H01M 10/6557* (2014.01)

(56) References Cited

U.S. PATENT DOCUMENTS

2015/0340674 A1* 11/2015 Tyler .................... H01M 2/1211
                                                            429/56
2020/0067045 A1* 2/2020 Takano ............... H01M 2/1077

* cited by examiner

VEHICLE BATTERY PACK

CROSS-REFERENCE TO RELATED APPLICATIONS

The present application claims priority from Japanese Patent Application No. 2017-136380 filed on Jul. 12, 2017, the entire contents of which are hereby incorporated by reference.

BACKGROUND

1. Technical Field

The present invention relates to a technical field of a vehicle battery pack including a storage case and battery stacks stored in the storage case.

2. Related Art

Hybrid automobiles and electric automobiles include large batteries. Such a battery supplies power to a motor that supplies a driving force to wheels and to various other electric components.

Such a large battery may have high temperature while the vehicle is traveling or while the battery is being charged. Therefore, the battery includes a cooling function. Furthermore, the battery includes a duct or the like for exhausting gas that may be generated if any malfunction occurs.

An exemplary battery disclosed by Japanese Unexamined Patent Application Publication (JP-A) No. 2016-134245 includes dedicated members such as a duct for cooling the battery, and a duct for smoke extraction.

SUMMARY OF THE INVENTION

An aspect of the present invention provides a vehicle battery pack including a plurality of battery stacks that each include a plurality of battery cells, a battery case that houses the plurality of battery stacks, a partition that divides an internal space of the battery case into an upper space and a lower space and is made of a plurality of materials, and an air passage at least part of which is defined by the partition.

DETAILED DESCRIPTION

Figure 1:
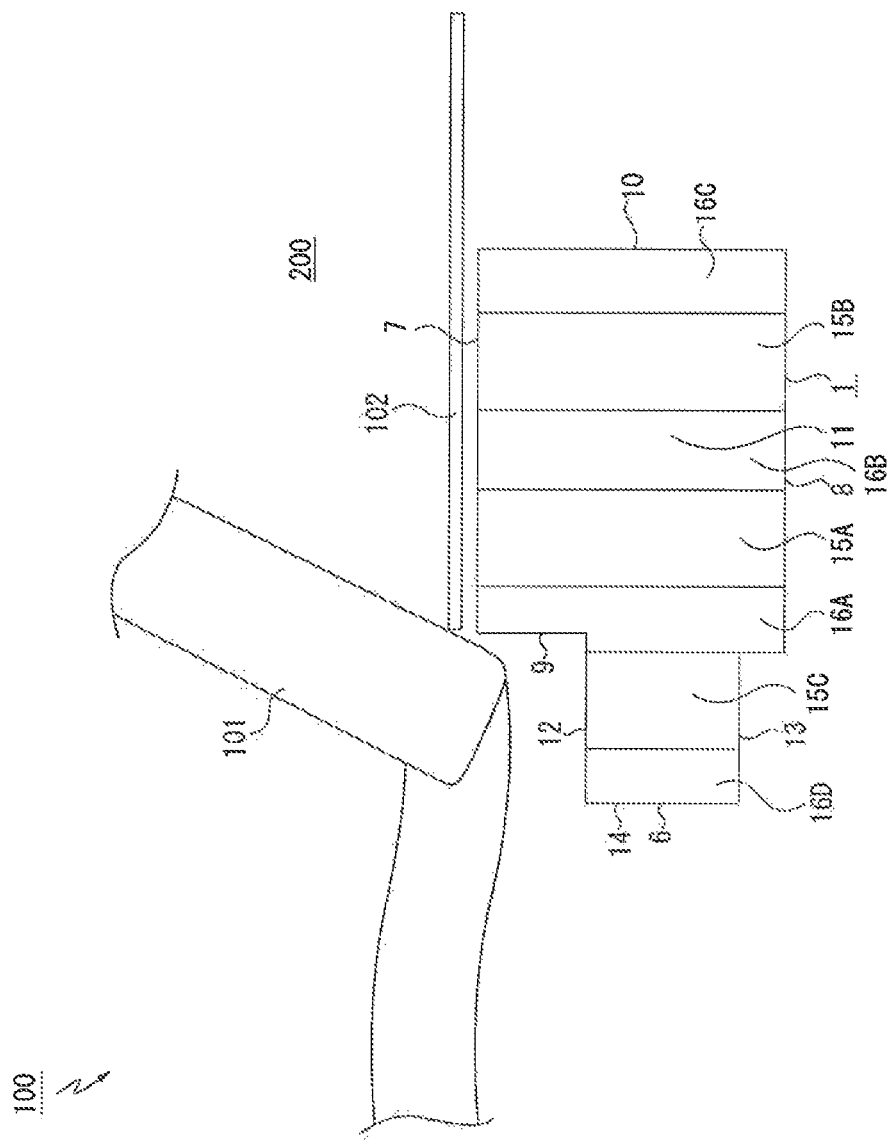
FIG. 1 is a schematic side view of a vehicle battery pack according to a first example that is provided in a vehicle.

Vehicle battery packs according to some examples of the present invention will now be described with reference to the accompanying drawings. Note that sizes, materials, specific values, and any other factors illustrated in respective examples are illustrative for easier understanding of the present invention, and are not intended to limit the scope of the present invention unless otherwise specifically stated. Further, elements in the following examples which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

Providing the ducts as dedicated members in the battery pack of JP-A No. 2016-134245 increases the number of components and the complexity of configuration, leading to a cost increase and a size increase of the battery.

Moreover, if such ducts are not made of materials that are suitable for individual uses, the performance of the ducts may be deteriorated.

It is desirable to improve the performance of air passages of the vehicle battery pack without increasing the cost and the number of components of the vehicle battery pack.

Herein, the widthwise direction of the vehicle is referred to as the left-right direction, and the front-back direction of the vehicle is simply referred to as the front-back direction.

A vehicle battery pack 1 according to a first example is provided in a vehicle 100 such as an electric automobile or a hybrid automobile. Specifically, as illustrated in FIG. 1, the vehicle 100 includes a trunk 200 behind a rear seat 101, and a partition plate 102 that separates the trunk 200 and a space below the trunk 200 from each other. The vehicle battery pack 1 is disposed below the partition plate 102.

The position of the vehicle battery pack 1 is only exemplary. The vehicle battery pack 1 may alternatively be disposed below, for example, the driver's seat or the passenger's seat.

A configuration of the vehicle battery pack 1 according to the first example will now be described.

Figure 2:
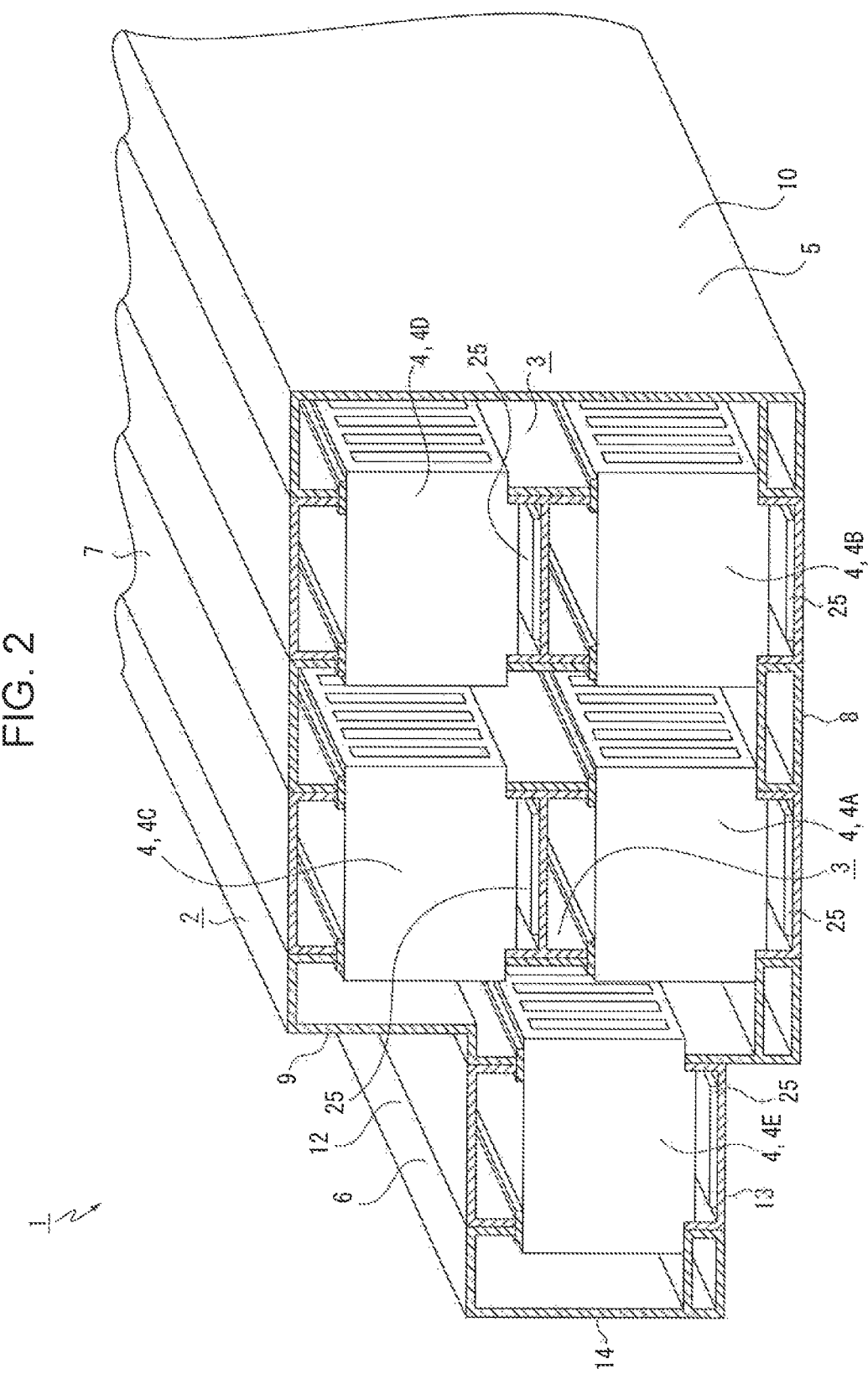
FIG. 2 is a perspective view of a vehicle battery pack according to the first example.
Figure 3:
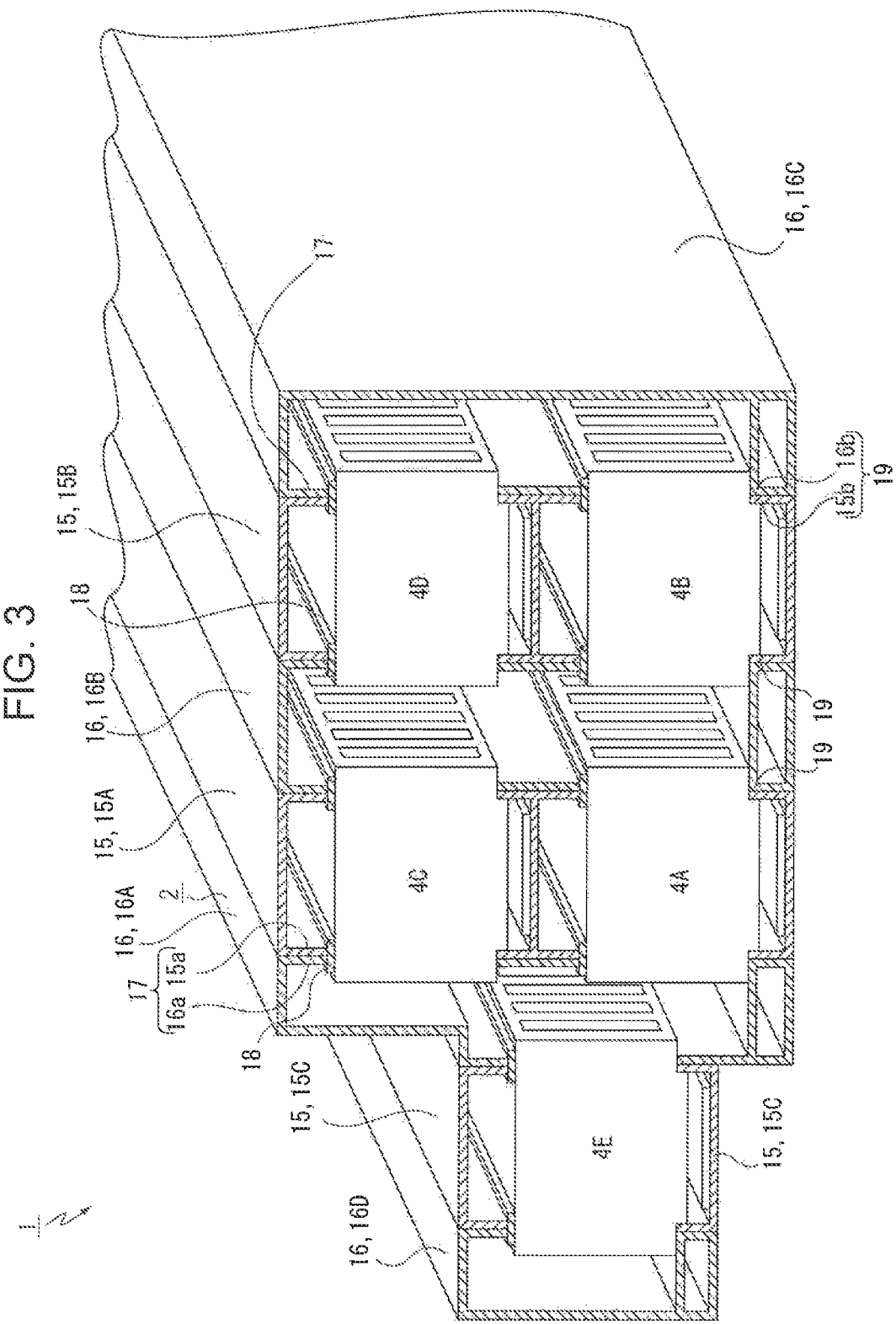
FIG. 3 is another perspective view of the vehicle battery pack according to the first example.

The vehicle battery pack 1 includes a battery case 2 having a substantially rectangular parallelepiped shape whose long sides extend in the left-right direction of the vehicle 100, partitions 3 that divide the space in the battery case 2 into two in the top-bottom direction, and battery stacks 4 disposed above and below the partitions 3 (see FIGS. 2 and 3).

The battery case 2 includes a rear unit 5, and a front projecting unit 6 projecting frontward from the rear unit 5. The rear unit 5 includes a top face 7, a bottom face 8, a front face 9, a rear face 10, and left and right side faces 11 (see FIG. 1). The front projecting unit 6 includes a projecting top face 12, a projecting bottom face 13, a projecting front face 14, and side faces 11.

The rear unit 5 of the battery case 2 houses four battery stacks 4. The front projecting unit 6 houses one battery stack 4.

Hereinafter, the lower two of the four battery stacks 4 in the rear unit 5 are denoted as battery stacks 4A and 4B, respectively, in that order from the vehicle front side; the upper two of the four battery stacks 4 in the rear unit 5 are denoted as battery stacks 4C and 4D, respectively, in that order from the vehicle front side; and the battery stack 4 in the front projecting unit 6 of the battery case 2 is denoted as battery stack 4E. If there is no need to distinguish the battery stacks 4 from each other, the battery stacks are each denoted as battery stack 4.

The battery stacks 4 each include a plurality of battery cells arranged side by side in the left-right direction.

Figure 4:
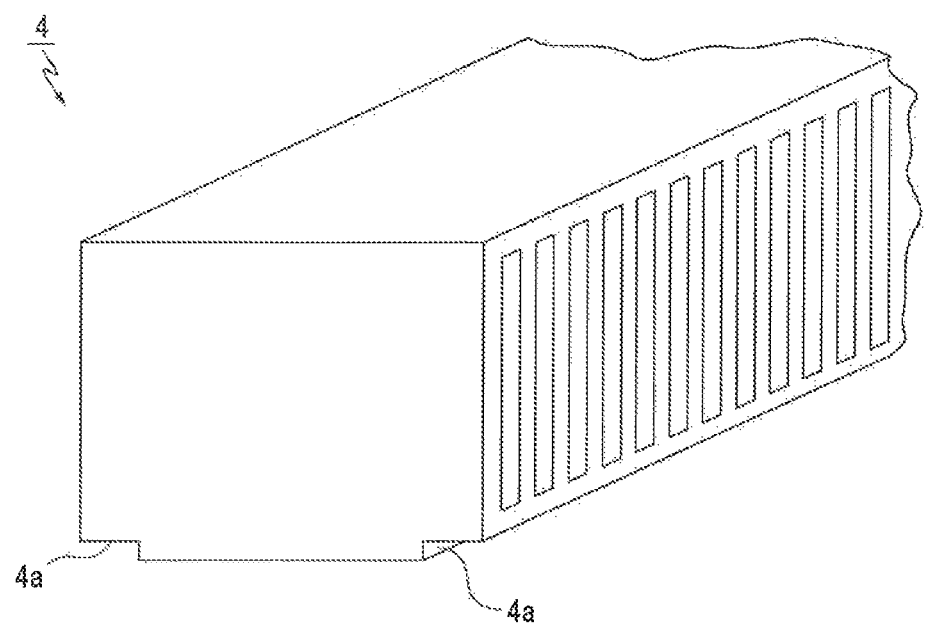
FIG. 4 is a perspective view of a battery stack.

Each battery stack 4 has a substantially rectangular parallelepiped shape and has support-receiving recesses 4a at the lower edges thereof on the vehicle front and rear sides, respectively (see FIG. 4).

A battery control unit, a relay device, a fuse, a connector terminal, a current sensor, and so forth (all not illustrated) are placed on the front projecting unit 6.

The battery case 2 is a multi-material member made of a plurality of materials that are joined together by relevant joining techniques or the like. Specifically, as illustrated in FIG. 3, the battery case 2 is formed of a plurality of metal members 15 and a plurality of resin members 16 made of resin or the like.

The resin members 16 included in the rear unit 5 of the battery case 2 are a resin member 16A positioned on the vehicle front side and including the front face 9, a resin member 16B positioned between the battery stacks 4A and 4B, and a resin member 16C positioned on the vehicle rear side and including the rear face 10.

The resin member 16 included in the front projecting unit 6 of the battery case 2 is a resin member 16D including the projecting front face 14.

The metal members 15 included in the rear unit 5 of the battery case 2 are a metal member 15A positioned between the resin members 16A and 16B, and a metal member 15B positioned between the resin members 16B and 16C.

The metal member 15 included in the front projecting unit 6 of the battery case 2 is a metal member 15C positioned on the rear side of the resin member 16D.

The rear unit 5 of the battery case 2 is formed of the resin member 16A, the metal member 15A, the resin member 16B, the metal member 15B, and the resin member 16C arranged continuously in that order from the vehicle front side.

The front projecting unit 6 of the battery case 2 is formed of the resin member 16D and the metal member 15C arranged continuously in that order from the vehicle front side.

The rear unit 5 of the battery case 2 has a plurality of pressers 17 extending from the lower surface of the top face 7 thereof. The pressers 17 press the battery stacks 4C and 4D in the upper row, respectively, from the upper side. The projecting top face 12 of the battery case 2 has two pressers 17 extending from the lower surface thereof. The pressers 17 press the battery stack 4E from the upper side.

The pressers 17 each include a projection 15a extending downward from one end of a corresponding one of the metal members 15 forming the top face 7, and a projection 16a extending downward from one end of a corresponding one of the resin members 16 forming the top face 7. Each presser 17 is provided with an insulator 18 at the bottom thereof. The insulator 18 is made of, for example, rubber, sponge, synthetic resin, or the like. Since the insulator 18 is interposed between the battery stack 4C or 4D and the presser 17, the presser 17 and the battery stack 4C or 4D are electrically insulated from each other. Furthermore, the heat conduction between the presser 17 and the battery stack 4C or 4D is suppressed.

The rear unit 5 of the battery case 2 has a plurality of supporting protrusions 19 on the upper surface of the bottom face 8 thereof. The supporting protrusions 19 support the battery stacks 4A and 4B from the lower side. The front projecting unit 6 of the battery case 2 has two supporting protrusions 19 on the upper surface of the projecting bottom face 13 thereof. The supporting protrusions 19 support the battery stack 4E from the lower side.

The supporting protrusions 19 each include a projection 15b extending upward from one end of a corresponding one of the metal members 15 forming the bottom face 8, and a projection 16b formed by raising part of a corresponding one of the resin members 16 forming the bottom face 8.

The projection 16b has a closed sectional shape, for example. Hence, the weight of the battery case 2 is reduced while the rigidity of the battery case 2 is maintained.

The supporting protrusions 19 are fitted in and in contact with the respective support-receiving recesses 4a of the battery stack 4.

The partitions 3 are provided between the battery stack 4A and the battery stack 4C and between the battery stack 4B and the battery stack 4D, respectively. That is, two partitions 3 are provided.

Figure 5:
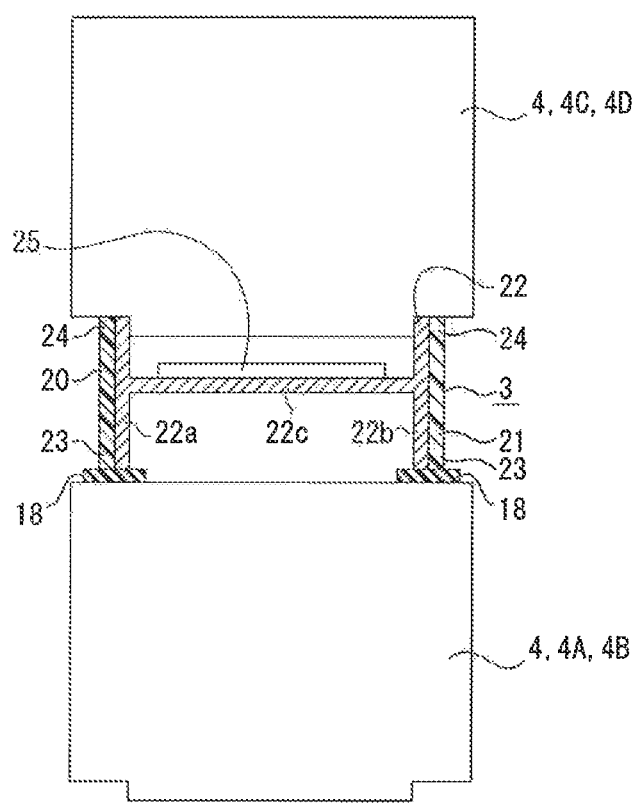
FIG. 5 is a schematic sectional view of battery stacks and a partition according to the first example.

The partitions 3 each extend from one of the side faces 11 of the battery case 2 to the other side face 11. As illustrated in FIG. 5, each partition 3 is made of a plurality of materials and has a substantially H cross-sectional shape.

Specifically, the partition 3 includes two flat resin members that face each other in the front-back direction, and a substantially H-shaped metal member that couples the resin members to each other. The front one of the resin members is denoted as a front resin member 20, the rear one of the resin members is denoted as a rear resin member 21, and the metal member provided between the two is denoted as an H metal member 22.

The H metal member 22 includes a flat front member 22a positioned on the front side, a flat rear member 22b positioned on the rear side, and a coupling member 22c coupling the front member 22a and the rear member 22b to each other.

The partition 3 is a multi-material member made of metal and resin that are joined together by relevant joining techniques or the like.

A combination of a lower part of the front resin member 20 of the partition 3 and a lower part of the front member 22a of the H metal member 22 serves as a presser 23 that presses the battery stack 4 positioned therebelow from the upper side. Likewise, a combination of a lower part of the rear resin member 21 of the partition 3 and a lower part of the rear member 22b of the H metal member 22 serves as another presser 23 that presses the battery stack 4 positioned therebelow from the upper side.

The insulator 18 is provided under the presser 23. Since the insulator 18 is provided between the battery stack 4 and the presser 23, the partition 3 and the battery stack 4 are electrically insulated from each other. Furthermore, the heat conduction between the partition 3 and the battery stack 4 is suppressed.

A combination of an upper part of the front resin member 20 of the partition 3 and an upper part of the front member 22a of the H metal member 22 serves as a supporting protrusion 24 that supports the battery stack 4 positioned thereabove from the lower side. Likewise, a combination of an upper part of the rear resin member 21 of the partition 3 and an upper part of the rear member 22b of the H metal member 22 serves as another supporting protrusion 24 that supports the battery stack 4 positioned thereabove from the lower side.

The supporting protrusions 24 are fitted in and in contact with the respective support-receiving recesses 4a of the battery stack 4. Therefore, the battery stack 4 is prevented from moving in the front-back direction relative to the battery case 2. Thus, the battery stack 4 is held stably.

The partition 3 has a substantially H cross-sectional shape and is therefore capable of stably supporting the battery stack 4, which has a heavy weight.

The battery stacks 4A, 4B, and 4E each have a long narrow shape extending in the left-right direction and are each generally supported by the supporting protrusions 19 that each extend from the one side face 11 to the other side face 11. Therefore, the battery stacks 4A, 4B, and 4E are kept supported in a good state, and the bending or deformation thereof is suppressed.

Likewise, the battery stacks 4C and 4D each have a long narrow shape extending in the left-right direction and are each generally supported by the partitions 3 that each extend from the one side face 11 to the other side face 11. Therefore, the battery stacks 4C and 4D are kept supported in a good state, and the bending or deformation thereof is suppressed.

If the temperature of each battery stack 4 drops below a given level, the internal resistance of the battery stack 4 increases, deteriorating the input-output characteristic of the battery stack 4. In the first example, as illustrated in FIGS. 2 and 5, a space below each of the battery stacks 4 serves as a heating space in which a heater 25 that heats the battery stack 4 is disposed.

Figure 6:
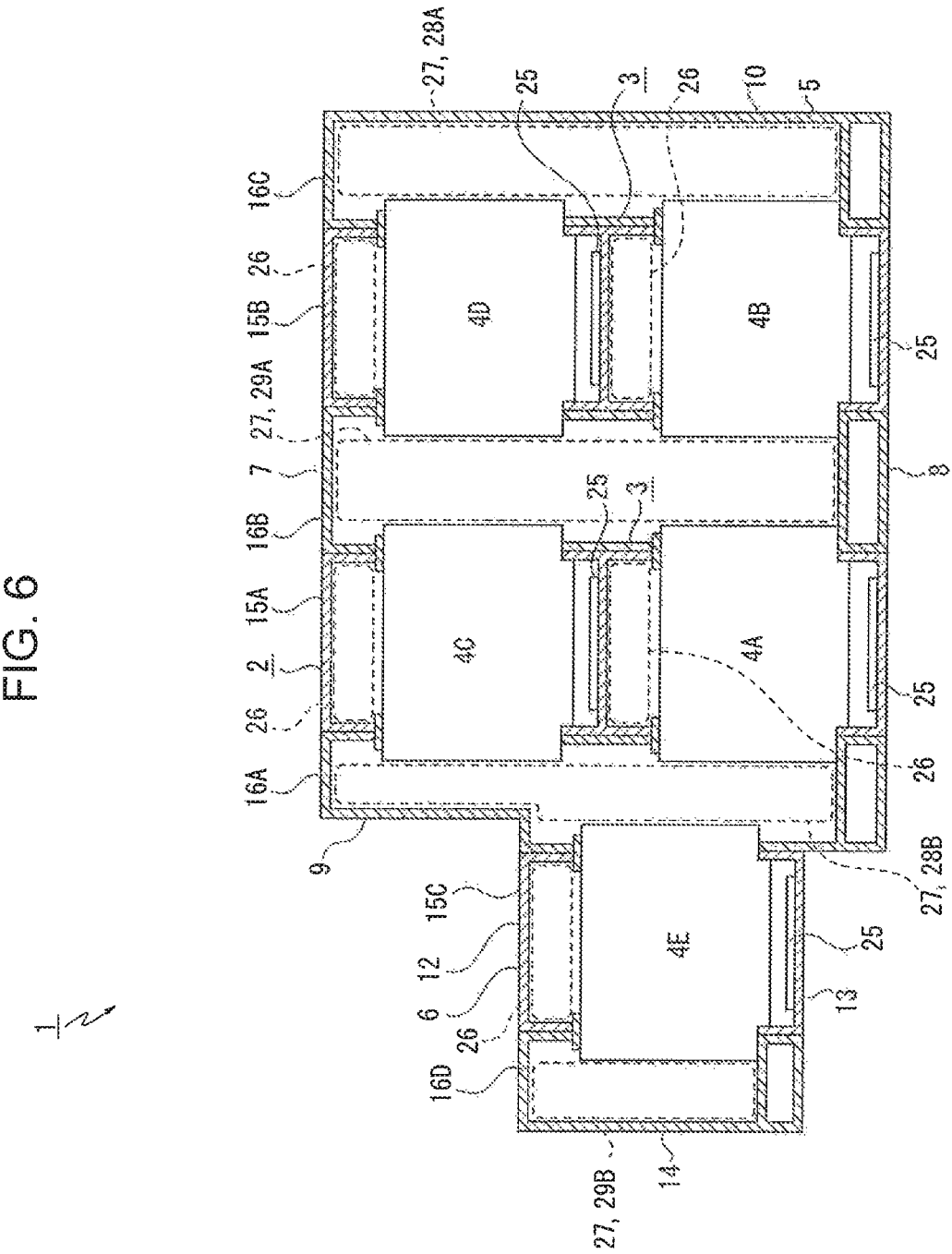
FIG. 6 illustrates spaces in the vehicle battery pack according to the first example.

The battery case 2 has a plurality of internal spaces that are separated from one another by relevant members, whereby various air passages and spaces are provided. Such air passages and spaces will now be described specifically with reference to FIG. 6.

A smoke-exhausting passage 26 is provided above each of the battery stacks 4. The smoke-exhausting passage 26 allows hot gas that may be generated from the battery stack 4 in case of a malfunction or the like to be exhausted to the outside of the battery case 2 and to the outside of the vehicle 100.

The smoke-exhausting passages 26 provided above and adjoining the battery stacks 4A and 4B are each defined by the upper surface of the battery stack 4A or 4B and the lower half of the H metal member 22 of the partition 3.

The smoke-exhausting passages 26 provided above and adjoining the battery stacks 4C and 4D are each defined by the upper surface of the battery stack 4C or 4D and part of the metal member 15A or 15B forming the top face 7 of the battery case 2.

The smoke-exhausting passage 26 provided above and adjoining the battery stack 4E is defined by the upper surface of the battery stack 4E and part of the metal member 15C forming the projecting top face 12 of the battery case 2.

Many of the members that define the smoke-exhausting passages 26 are made of metal. Therefore, the heat of the hot gas passing through the smoke-exhausting passages 26 is efficiently transmitted to the smoke-exhausting passages 26.

The heating space below each of the battery stacks 4 is enclosed by the lower surface of the battery stack 4 and a metal member.

Specifically, the heating space below each of the battery stacks 4A and 4B is enclosed by the lower surface of the battery stack 4A or 4B and part of the metal member 15A or 15B forming the bottom face 8 of the battery case 2.

The heating space below each of the battery stacks 4C and 4D is enclosed by the lower surface of the battery stack 4C or 4D and the upper half of the H metal member 22 of the partition 3.

The heating space below the battery stack 4E is enclosed by the lower surface of the battery stack 4E and part of the metal member 15C forming the projecting bottom face 13 of the battery case 2.

To prevent the battery stack 4 from being excessively heated by the heat generated from the heater 25, the heat is released to the outside to some extent through the metal part enclosing the heating space.

Cooling-air passages 27 through which air for cooling the battery stacks 4 passes are provided on the front and the rear sides, respectively, of the battery stacks 4. Specifically, an intake passage 28A through which air taken for cooling the battery stacks 4B and 4D passes is provided on the rear side of the battery stacks 4B and 4D. Furthermore, an intake passage 28B through which air taken for cooling the battery stacks 4A, 4C, and 4E passes is provided on the front side of the battery stacks 4A and 4C and on the rear side of the battery stack 4E.

The cooling air is taken from the outside of the vehicle 100 or from the vehicle cabin through a duct or a fan (not illustrated) into the intake passages 28A and 28B.

An exhaust passage 29A through which air having cooled the battery stacks 4A, 4B, 4C, and 4D passes is provided on the rear side of the battery stacks 4A and 4C and on the front side of the battery stacks 4B and 4D. Furthermore, an exhaust passage 29B through which air having cooled the battery stack 4E passes is provided on the front side of the battery stack 4E.

The cooling air taken in from the intake passages 28A and 28B passes through gaps between adjacent ones of the battery cells included in each of the battery stacks 4 in, for example, the front-back direction, thereby taking the heat from the battery cells. Then, the cooling air flows into the exhaust passages 29A and 29B, passes through the duct and the fan (not illustrated), and is exhausted to the outside of the vehicle 100.

When the battery stacks 4 are in use or are being charged, cooling air is supplied to the battery cells through the intake passages 28A and 28B. Therefore, the rise of the temperature of the battery cells is suppressed, and the deterioration of the battery cells and the reduction in the regeneration efficiency are suppressed.

Most of the members defining the cooling-air passages 27 serving as the intake passages 28A and 28B and the exhaust passages 29A and 29B are made of resin. Specifically, the intake passage 28A is defined by the resin member 16C and the rear resin member 21 of the rear one of the partitions 3.

The intake passage 28B is defined by the resin member 16A and the front resin member 20 of the front one of the partitions 3.

The exhaust passage 29A is defined by the resin member 16B, the rear resin member 21 of the front one of the partitions 3, and the front resin member 20 of the rear one of the partitions 3.

The exhaust passage 29B is defined by the resin member 16D.

Resin conducts less heat than metal and the like. Since the cooling-air passages 27 are made of resin, the cooling air that passes through the intake passages 28 (28A and 28B) is prevented from being heated by the heat from the outside of the vehicle battery pack 1 or by the heat from the metal members 15 before the cooling air cools the battery stacks 4. Furthermore, the heat of the air having cooled the battery stacks 4 and flowing in the exhaust passages 29 (29A and 29B) is prevented from being transmitted back to the battery stacks 4 through peripheral members.

The intake passages 28 and the exhaust passages 29 are not provided as dedicated members but are each defined by part of the inner wall of the battery case 2, part of a corresponding one of the battery stacks 4, and part of a corresponding one of the partitions 3. Such a configuration contributes to the reduction in the number of components to be included in the vehicle battery pack 1 and to the reduction in the size of the vehicle battery pack 1. Since the number of components is reduced, the cost of the vehicle battery pack 1 is reduced.

Figure 7:
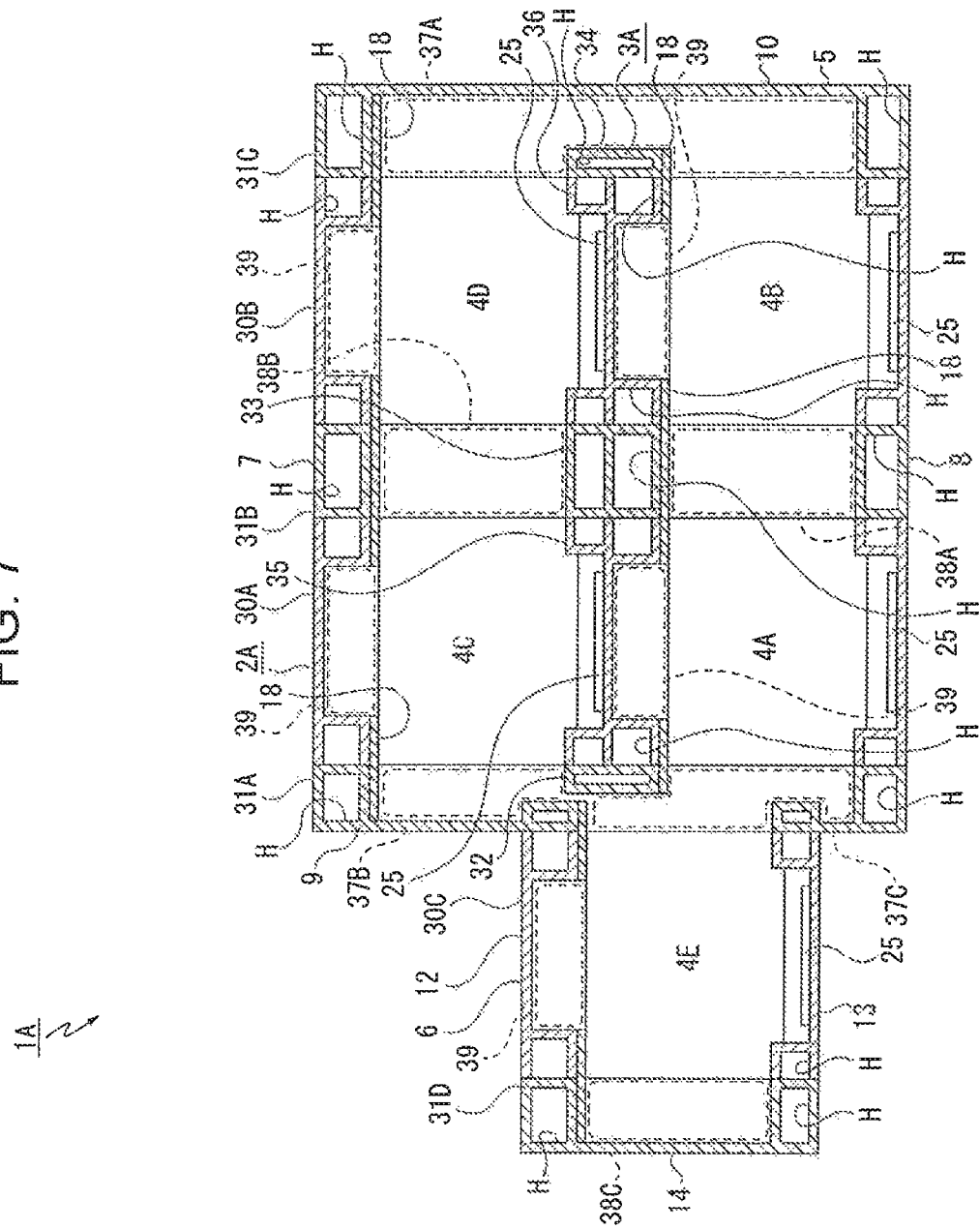
FIG. 7 illustrates a vehicle battery pack according to a second example.

Referring now to FIG. 7, a vehicle battery pack 1A according to a second example will be described. The following description is focused mainly on differences from the vehicle battery pack 1. Accordingly, description of elements that are the same as those of the vehicle battery pack 1 is omitted.

As with the case of the vehicle battery pack 1 according to the first example, a battery case 2A of the vehicle battery pack 1A is a multi-material member made of a plurality of materials.

Specifically, the battery case 2A includes metal members 30A, 30B, and 30C and resin members 31A, 31B, 31C, and 31D.

The battery case 2A that is formed of the metal members 30A, 30B, and 30C and the resin members 31A, 31B, 31C, and 31D has a plurality of closed-section parts H. The closed-section parts H each extend from one of the side faces 11 of the battery case 2A to the other side face 11.

Insulators 18 are interposed between the lower surfaces of the closed-section parts H provided on the top face 7 of the battery case 2A and the battery stacks 4C and 4D in the upper row. Thus, the battery case 2A and the battery stacks 4C and 4D are kept electrically insulated from each other.

The corners of the closed-section parts H provided on the bottom face 8 of the battery case 2A are fitted in and in contact with the respective support-receiving recesses 4a provided in the battery stacks 4A and 4B in the lower row.

The vehicle battery pack 1A includes one partition 3A. The partition 3A is positioned above the battery stacks 4A and 4B and below the battery stacks 4C and 4D.

The partition 3A includes a front-end resin member 32 positioned on the vehicle front side, a middle resin member 33 positioned in the middle in the front-back direction of the partition 3A, a rear-end resin member 34 positioned on the vehicle rear side, a front metal member 35 positioned between the front-end resin member 32 and the middle resin member 33, and a rear metal member 36 positioned between the middle resin member 33 and the rear-end resin member 34.

The resin members 32 to 34 and the metal members 35 and 36 are joined into a multi-material member by relevant joining techniques or the like.

The partition 3A has the plurality of closed-section parts H. The closed-section parts H each extend from the one side face 11 of the battery case 2A to the other side face 11.

The corners of the closed-section parts H provided on the upper side of the partition 3A are fitted in and in contact with the respective support-receiving recesses 4a of the battery stacks 4C and 4D in the upper row.

Insulators 18 are interposed between the lower surfaces of the closed-section parts H provided on the lower side of the partition 3A and the battery stacks 4A and 4B in the lower row. Thus, the partition 3A and the battery stacks 4A and 4B are kept electrically insulated from each other.

Cooling-air passages 27 through which air for cooling the battery stacks 4 passes are provided on the front and the rear sides of the battery stacks 4.

Specifically, an intake passage 37A through which air taken in for cooling the battery stacks 4B and 4D passes is provided on the rear side of the battery stacks 4B and 4D.

Two intake passages 37B and 37C that are almost separate from each other are provided on the front side of the battery stacks 4A and 4C and on the rear side of the battery stack 4E. The intake passages 37B and 37C are each defined by the battery case 2A and the partition 3A. The intake passage 37B is on the upper side for cooling the battery stack 4C. The intake passage 37C is on the lower side for cooling the battery stacks 4A and 4E.

Note that the spaces in the intake passages 37B and 37C that are enclosed by the battery case 2A and the partition 3A may be completely separate from each other or may be provided as one continuous space.

An exhaust passage 38A through which the air having cooled the battery stacks 4A and 4B passes is provided between the battery stacks 4A and 4B.

An exhaust passage 38B through which the air having cooled the battery stacks 4C and 4D passes is provided between the battery stacks 4C and 4D.

An exhaust passage 38C through which the air having cooled the battery stack 4E passes is provided on the front side of the battery stack 4E.

The intake passages 37A, 37B, and 37C and the exhaust passages 38A, 38B, and 38C are mainly defined by resin members. The resin members serve as heat insulators and prevent the air yet to be used for cooling from being warmed or prevents the heat of the air having used for cooling from being transmitted to the battery stacks 4.

A combination of the upper surface of the battery stack 4C and the metal member 30A of the battery case 2A and a combination of the upper surface of the battery stack 4D and the metal member 30B of the battery case 2A define smoke-exhausting passages 39, respectively, through which hot gas generated from the respective battery stacks 4 is exhausted.

Likewise, a combination of the upper surface of the battery stack 4A and the front metal member 35 of the partition 3A and a combination of the upper surface of the battery stack 4B and the rear metal member 36 of the partition 3A define other smoke-exhausting passages 39, respectively, through which hot gas generated from the respective battery stacks 4 is exhausted.

A combination of the upper surface of the battery stack 4E and the metal member 30C defines another smoke-exhausting passage 39 through which hot gas generated from the battery stack 4E is exhausted.

At least part of each smoke-exhausting passage 39 is made of metal. Therefore, the heat of the hot gas is efficiently transmitted thereto and released therefrom. In particular, in the vehicle battery pack 1A according to the second embodiment, most part of each smoke-exhausting passage 39 is made of metal. Therefore, the heat of the hot gas is more efficiently transmitted thereto.

The battery case 2A of the vehicle battery pack 1A includes a plurality of closed-section parts H. Therefore, the strength of the battery case 2A is increased. The partition 3A also includes a plurality of closed-section parts H. Therefore, the strength of the partition 3A is increased. Thus, the battery stacks 4C and 4D in the upper row are held stably.

Furthermore, the area of contact between the metal members 30 (30A, 30B, and 30C) and the resin members 31 (31A, 31B, 31C, and 31D) of the battery case 2A of the vehicle battery pack 1A according to the second embodiment is smaller than in the case of the vehicle battery pack 1 according to the first example. Therefore, the amount of heat that is transmitted from the metal members 30 to the resin members 31 is reduced. Accordingly, the air passing through the cooling-air passages 27 is prevented from, for example, being warmed.

Figure 8A:
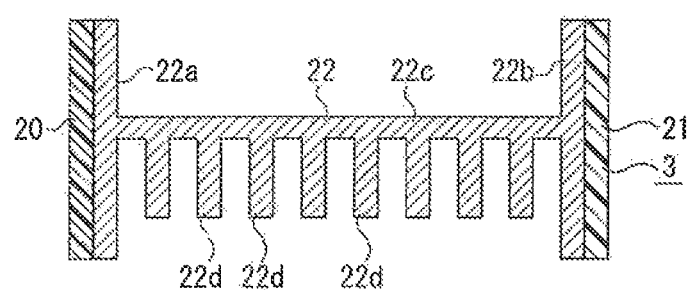
FIGS. 8A and 8B are schematic sectional views of partitions according to modifications, respectively.
Figure 8B:
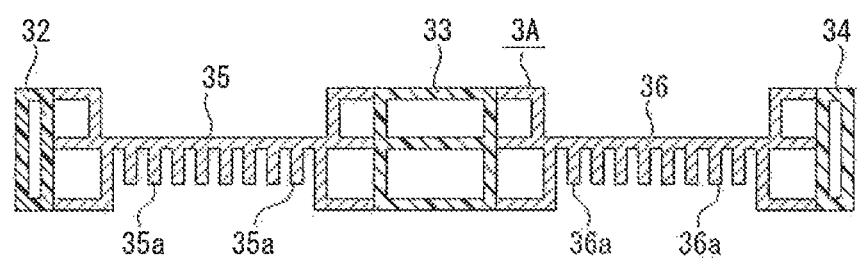

Referring now to FIGS. 8A and 8B, modifications of the vehicle battery packs 1 and 1A according to the first and second examples that each include heat-radiating fins will be described.

FIG. 8A illustrates a modification of the partition 3 included in the vehicle battery pack 1 according to the first example. The partition 3 in this modification has a plurality of heat-radiating fins 22d on the lower surface of the coupling member 22c of the H metal member 22.

The heat-radiating fins 22d transmit some of the heat generated by the heater 25 to the air flowing in the smoke-exhausting passage 26.

FIG. 8B illustrates a modification of the partition 3A included in the vehicle battery pack 1A according to the second example. The partition 3A in this modification has a plurality of heat-radiating fins 35a and a plurality of heat-radiating fins 36a on the lower surface of the front metal member 35 and on the lower surface of the rear metal member 36, respectively.

The heat-radiating fins 35a and the heat-radiating fins 36a transmit some of the heat generated by the heater 25 to the air flowing in the smoke-exhausting passages 39.

The partition 3 or the partition 3A included in the vehicle battery pack 1 or the vehicle battery pack 1A has the heat-radiating fins 22d or the heat-radiating fins 35a and 36a. Therefore, the battery stacks 4C and 4D are prevented from being heated excessively by the heater 25.

Originally, the smoke-exhausting passages 39 work only when any of the battery stacks 4 have malfunctions. However, since the heat from the heater 25 is transmitted to the air passing through the smoke-exhausting passages 39, the smoke-exhausting passages 39 have a certain role even in normal times. That is, the smoke-exhausting passages 39 are utilized effectively. Specifically, the vehicle battery pack 1 or 1A does not need to include dedicated components or the like for preventing the excessive rise of the temperature of the battery stacks 4C and 4D that may be caused by the heater 25. Such a configuration contributes to the reduction in the number of components, the size reduction, and the cost reduction of the vehicle battery pack 1 or 1A.

As described above, the partition 3 or 3A is a multi-material member made of a plurality of materials that are joined together by relevant joining techniques. Therefore, suitable materials can be disposed at suitable positions, and the weight of the partition 3 or 3A can be reduced.

Likewise, the battery case 2 or 2A is also a multi-material member. Therefore, suitable materials can be disposed at suitable positions, and the weight of the battery case 2 or 2A can be reduced.

The battery stacks 4C and 4D in the upper row are supported by the partition 3 or 3A from end to end in the left-right direction. The partition 3 or 3A is in contact with the upper surfaces of the battery stacks 4A and 4B from end to end in the left-right direction. That is, the partition 3 or 3A suppresses the bending of the battery stacks 4C and 4D, and the battery stacks 4A and 4B suppress the bending of the partition 3 or 3A.

The battery stacks 4A and 4B in the lower row are supported by the supporting protrusions 19 of the battery case 2 or 2A from end to end in the left-right direction. The supporting protrusions 19 have closed sections and thus have high strength. Therefore, the battery stacks 4A and 4B are supported by the supporting protrusions 19 in such a manner as not to bend.

The battery stacks 4 are prevented from moving in the top-bottom direction by the upper and lower surfaces of the battery case 2 or 2A (particularly, by the pressers 23 and the supporting protrusions 19) and by the partition 3 or 3A. Furthermore, the supporting protrusions 19 provided to the partition 3 or 3A and to the battery case 2 or 2A are fitted in and in contact with the support-receiving recesses 4a of the battery stacks 4. Therefore, the battery stacks 4 are also prevented from moving in the front-back direction. Furthermore, the battery stacks 4 are prevented from moving in the left-right direction by the left and right side faces 11 of the battery case 2 or 2A. That is, the battery stacks 4 are held in the battery case 2 or 2A in such a manner as not to move in the top-bottom, left-right, and front-back directions. Therefore, the battery stacks 4 are prevented from being damaged as a result of moving in the battery case 2 or 2A. Moreover, since the battery stacks 4 are held stably, stable behavior of the battery stacks 4 is assured.

If the vehicle battery pack 1 or 1A is disposed on the rear side of the vehicle 100, the vehicle battery pack 1 or 1A may receive an impact in case of, for example, collision of the vehicle 100 with another vehicle from the back thereof. In such a case, in the vehicle battery pack 1 or 1A, the resin member 16C or 31C and the rear-end resin member 34 of the partition 3A that are at the rearmost positions are squashed. Thus, the impact at the collision is absorbed, and the battery stacks 4 are protected.

If the impact from the back is considerable and is not absorbable by the resin member 16C or 31C and the like, the resin member 16B or 31B, the resin member 16A or 31A, or the middle resin member 33 or the front-end resin member 32 of the partition 3A is squashed. Thus, the impact at the collision is further absorbed, and the battery stacks 4 are further protected.

Parts of the battery case 2 or 2A and parts of the partition 3 or 3A that are above and below the battery stacks 4 are made of metal. Therefore, survival spaces for the battery stacks 4 are assuredly provided in case of collision or the like. Thus, the battery stacks 4 are prevented from being damaged.

Furthermore, for example, even if any high-voltage component such as a terminal (not illustrated) is provided on the upper surface of each of the battery stacks 4, a survival space for such a high-voltage component is assuredly provided by the above metal parts, and the high-voltage component is prevented from being damaged. Such a configuration contributes to safety improvement.

According to the above modifications, the smoke-exhausting passages 26 or 39 each have a rugged shape with the heat-radiating fins 22d or 35a. The rugged shape also has a role of absorbing electromagnetic noise. Hence, providing the heat-radiating fins 22d or 35a to the smoke-exhausting passages 26 or 39 can protect the battery stacks 4 from electromagnetic noise.

As described above, the vehicle battery pack 1 (1A) according to the first (second) example includes a plurality of battery stacks 4 that each include a plurality of battery cells, the battery case 2 (2A) that houses the plurality of battery stacks 4, the partitions 3 (3A) that each divide the internal space of the battery case 2 (2A) into an upper space and a lower space and are each made of a plurality of materials, and the air passages (the cooling-air passages 27 and the smoke-exhausting passages 26 (39)). At least part of each of the air passages is defined by a corresponding one of the partitions 3 (3A).

The partitions 3 (3A) of the vehicle battery pack 1 (1A) are each made of a plurality of materials, and the air passages are each defined by a corresponding one of the partitions 3 (3A). Thus, the air passages can be defined by materials that are suitable for individual uses. That is, the performance of the air passages is improved because suitable materials are employed.

The battery case 2 (2A) of the vehicle battery pack 1 (1A) may be made of a plurality of materials.

If not only the partition 3 (3A) but also the battery case 2 (2A) is provided as, for example, a multi-material member made of a plurality of materials and the relevant air passages are defined by the partition 3 (3A) and the battery case 2 (2A), the air passages can be defined by materials that are suitable for individual uses. That is, the performance of the air passages is improved because suitable materials are employed.

In the vehicle battery pack 1 (1A), the smoke-exhausting passages 26 (39) may be provided above the battery stacks 4, the cooling-air passages 27 may be provided on the side of the battery stacks 4, and the smoke-exhausting passages 26 (39) and the cooling-air passages 27 may be defined by different materials.

Defining the cooling-air passages 27 and the smoke-exhausting passages 26 (39) by different materials implies that the air passages can be defined by respective materials that are most suitable for their individual characteristics. Thus, the performance can be improved.

The battery case 2 (2A) and the partitions 3 (3A) may each be formed of metal members and resin members. The smoke-exhausting passages 26 (39) may each be defined by part of a corresponding one of the metal members 15 (30) forming the battery case 2 (2A) and part of any of the metal members (the H metal member 22, the front metal member 35, and the rear metal member 36) forming a corresponding one of the partitions 3 (3A). The cooling-air passages 27 may each be defined by part of a corresponding one of the resin members 16 (31) forming the battery case 2 (2A) and part of any of the resin members (the front resin member 20, the rear resin member 21, the front-end resin member 32, the middle resin member 33, and the rear-end resin member 34) forming a corresponding one of the partitions 3 (3A).

If at least part of each smoke-exhausting passage 26 (39) is defined by the above metal members, the heat of the hot gas is efficiently transmitted thereto and radiated therefrom. In particular, most part of the smoke-exhausting passage 26 (39) of the vehicle battery pack 1 (1A) according to the first (second) example is defined by metal members. Therefore, the heat of the hot gas is transmitted more efficiently.

If the cooling-air passages 27 are each defined by the above resin members, the cooling air passing through the intake passages 28 (37) is prevented from being warmed, before cooling the battery stacks 4, by the heat from the outside of the vehicle battery pack 1 (1A) or by the heat from the metal members 15 (30). Meanwhile, the heat of the air having cooled the battery stacks 4 is prevented from being transmitted back to the battery stacks 4 through peripheral members when the air passes through the exhaust passages 29 (38).

The space below each of the battery stacks 4 may serve as a heating space in which the heater 25 is disposed.

If the heating space is provided below the battery stack 4, air that has been heated and risen upward heats the battery stack 4 efficiently. Hence, even if the internal resistance increases and the input-output characteristic is deteriorated, the battery stack 4 can quickly recover from such a state.

The heating space may be enclosed by part of a corresponding one of the metal members 15 (30) forming the battery case 2 (2A) and part of any of the metal members (the H metal member 22, the front metal member 35, and the rear metal member 36) forming a corresponding one of the partitions 3 (3A).

If at least part of the heating space is enclosed by such metal members, the heat can be radiated from the metal member to an appropriate extent. Consequently, the battery stacks 4 are prevented from being heated excessively with the heat generated by the heater 25.

A portion of the battery case 2 (2A) that is on the vehicle rear side may be made of resin.

The portion of the battery case 2 (2A) according to the first (second) example is formed of the resin member 16C (31C) and the like. Hence, even if any impact is applied to the battery case 2 from the back of the vehicle 100, the impact can be absorbed by the resin member 16C (31C) that is squashable. Thus, each of the battery stacks 4 disposed in the battery case 2 (2A) can be protected.

At least part of each of the air passages (the cooling-air passages 27 and the smoke-exhausting passages 26 (39)) may be defined by the resin member 16C (31C) forming the portion of the battery case 2 (2A) that is on the vehicle rear side.

Specifically, in the first (second) example, the intake passage 28A (37A) is defined by the resin member 16C (31C) positioned on the vehicle rear side. Hence, even if the resin member 16C (31C) is squashed by an impact applied thereto from the back, it is highly probable that only the intake passage 28A (37A) is deformed. Accordingly, other members are prevented from causing malfunctions or being damaged.

The invention claimed is:
1. A vehicle battery pack comprising:
a plurality of battery stacks that each comprise a plurality of battery cells; a battery case that houses the plurality of battery stacks;
a partition that divides an internal space of the battery case into an upper space and a lower space and is made of a plurality of materials;
seals; and
an air passage configuration at least part of which is defined by the partition, and
wherein the air passage configuration comprises a smoke-exhausting passage and a cooling-air passage that are sealed from one another by the seals,
wherein the smoke-exhausting passage is provided above the battery stacks,
wherein the cooling-air passage is provided on a side of the battery stacks, and
wherein the smoke-exhausting passage and the cooling-air passage are defined by different materials,
wherein an exterior surface of the battery case is formed of a repeating sequence of resin portions which form cooling-air passages and metal portions which form smoke-exhausting passages, and
wherein the cooling-air passages are in fluid communication with a cooling air source and the smoke-exhausting passages are configured to exhaust a gas generated by one or more battery cell of the plurality of battery cells.
2. The vehicle battery pack according to claim 1,
wherein the battery case and the partition are each made of a metal member and a resin member,
wherein the smoke-exhausting passage is defined by part of the metal member forming the battery case and part of the metal member forming the partition, and wherein the cooling-air passage is defined by part of the resin member forming the battery case and part of the resin member forming the partition.

3. The vehicle battery pack according to claim 1, wherein a space below one or more of the plurality of battery stacks serves as a heating space in which a heater is disposed.

4. The vehicle battery pack according to claim 3, wherein for each heating space in which a heater is disposed, the heating space is enclosed by part of a metal member forming the battery case and part of a metal member forming the partition.

5. The vehicle battery pack according to claim 1, wherein a portion of the battery case is made of resin, the portion being on a vehicle rear side.

6. The vehicle battery pack according to claim 5, wherein at least part of the air passage configuration is defined by the portion on the vehicle rear side.

7. The vehicle battery pack according to claim 1, wherein the case includes a portion on the vehicle rear side, the portion on the vehicle rear side being made of resin.

8. The vehicle battery pack according to claim 7, wherein at least part of the air passage configuration is defined by the portion on the vehicle rear side.

9. The vehicle battery pack according to claim 1, wherein in a front-to-rear direction of the vehicle, there is a sequence of resin-metal-resin channel forming members.

10. The vehicle battery pack according to claim 1, wherein the cooling-air and smoke-exhausting passages extend in a direction transverse to the direction of the repeating sequence of resin portions and metal portions.

11. A vehicle battery pack comprising:
a plurality of battery stacks that each comprise a plurality of battery cells;
a battery case that houses the plurality of battery stacks;
a partition that divides an internal space of the battery case into an upper space and a lower space and is positioned between an upper one of the plurality of battery stacks and a lower one of the plurality of battery stacks as to be in a compression relationship between the upper one and the lower one of the plurality of battery stacks, and wherein the partition is made of a plurality of materials, including a first material A and a second material B, with the thermal conductivity of A being less than B; and
an air passage configuration at least part of which is defined by the partition wherein the air passage configuration comprises a smoke-exhausting passage configured to exhaust a gas generated by one or more battery cell of the plurality of battery cells and a cooling-air passage which is in fluid communication with a cooling air source and sealed from the smoke-exhausting passage,
and wherein the part of the cooling-air passage defined by the partition has a material ratio content of A/B that is greater than that of the part of the smoke-exhausting passage defined by the partition, and
wherein in the front to rear direction of the vehicle, there is a repeating material sequence of A-B for channel defining members that combine to define at least one surface of the battery case.

12. The vehicle battery pack according to claim 11, wherein a space below one or more of the plurality of battery stacks serves as a heating space in which a heater is disposed.

13. The vehicle battery pack according to claim 11, wherein the material A is a resin and the material B is a metal.

14. The vehicle battery pack according to claim 13,
wherein the battery case and the partition are each made of a metal member and a resin member,
wherein the smoke-exhausting passage is defined by part of the metal member forming the battery case and part of the metal member forming the partition, and
wherein the cooling-air passage is defined by part of the resin member forming the battery case and part of the resin member forming the partition.

15. The vehicle battery pack according to claim 13, wherein the heating space is enclosed by part of a metal member forming the battery case and part of a metal member forming the partition.

16. The vehicle battery pack according to claim 11, wherein a portion of the battery case is made of the resin, the portion being on a vehicle rear side.

17. The vehicle battery pack according to claim 16, wherein at least part of the air passage configuration is defined by the portion on the vehicle rear side.

18. The vehicle battery pack according to claim 11, wherein, in the front to rear direction of the vehicle, the partition has a sequence of materials A-B-A, and both material A and B are in contact with seals so as to separate the smoke-exhausting passage from the cooling-air passage.

19. The vehicle battery pack according to claim 11 wherein the portion of the partition in contact with cooling flow in the cooling-air passage is limited to a surface material formed of material A, and the portion of the partition in contact with exhaust flow in the smoke-exhausting passage is limited to a surface material formed of material B.

* * * * *